(12) United States Patent
Wang et al.

(10) Patent No.: US 12,448,524 B2
(45) Date of Patent: Oct. 21, 2025

(54) SUPERHYDROPHOBIC COATING, METHOD FOR PREPARING SAME AND USE THEREOF

(71) Applicants: Guangdong Midea White Home Appliance Technology Innovation Center Co., Ltd., Foshan (CN); Midea Group Co., Ltd., Foshan (CN); Donghua University, Shanghai (CN)

(72) Inventors: Liying Wang, Foshan (CN); Junhong Yao, Foshan (CN); Zhuohua Yan, Foshan (CN); Long Chen, Foshan (CN); Dengteng Ge, Shanghai (CN); Yiping Zhao, Shanghai (CN); Ting Yu, Shanghai (CN)

(73) Assignees: Guangdong Midea White Home Appliance Technology Innovation Center Co., Ltd., Foshan (CN); Midea Group Co., Ltd., Foshan (CN); Donghua University, Shanghai (CN)

( * ) Notice: Subject to any disclaimer, the term of this patent is extended or adjusted under 35 U.S.C. 154(b) by 721 days.

(21) Appl. No.: 17/843,850

(22) Filed: Jun. 17, 2022

(65) Prior Publication Data
US 2022/0325108 A1  Oct. 13, 2022

Related U.S. Application Data

(63) Continuation of application No. PCT/CN2020/138021, filed on Dec. 21, 2020.

(30) Foreign Application Priority Data

Dec. 20, 2019  (CN) ............................ 201911328900

(51) Int. Cl.
C09D 5/00  (2006.01)
B05D 5/08  (2006.01)
(Continued)

(52) U.S. Cl.
CPC ................. *C09D 5/00* (2013.01); *C09D 7/45* (2018.01); *C09D 7/62* (2018.01); *C09D 7/63* (2018.01);
(Continued)

(58) Field of Classification Search
CPC ... C09D 5/00; C09D 7/68; C09D 7/63; C09D 7/45; C09D 7/62; C09D 125/06;
(Continued)

(56) References Cited

U.S. PATENT DOCUMENTS

2006/0154048 A1* 7/2006 Teranishi ................. C09D 1/00
                                                        106/311
2015/0004442 A1  1/2015 Saxe et al.

FOREIGN PATENT DOCUMENTS

CN  101456016 A  6/2009
CN  104046152 A  9/2014
(Continued)

OTHER PUBLICATIONS

Midea Group Co., Ltd., ISR, PCT/CN2020/138021, Mar. 8, 2021, 3 pgs.
(Continued)

Primary Examiner — Robert S Jones, Jr.
Assistant Examiner — Elizabeth Amato
(74) Attorney, Agent, or Firm — Morgan, Lewis & Bockius LLP

(57) ABSTRACT

A superhydrophobic coating having a three-dimensional porous nanocomposite structure, includes: a constructing unit and a bonding unit; the constructing unit comprises inorganic hydrophobic nanoparticles, the bonding unit comprises hydrophobic polymer nanomicrospheres, and the inorganic hydrophobic nanoparticles and the hydrophobic polymer nanomicrospheres are interconnected to form uniform pores. A method for preparation of the superhydro-
(Continued)

○ Hydrophobic polymer nanomicrosphere

● Inorganic hydrophobic nanoparticle phobic coating includes: mixing the inorganic hydrophobic nanoparticles with the hydrophobic polymer nanomicrospheres in a dispersant to form a coating solution; and coating the coating solution on the surface of a substrate using a dip coating, roll coating or spray coating process, and drying to form the superhydrophobic coating of a three-dimensional porous nanocomposite structure.

12 Claims, 1 Drawing Sheet

(51) Int. Cl.
| | |
|---|---|
| C08K 9/06 | (2006.01) |
| C09D 7/40 | (2018.01) |
| C09D 7/45 | (2018.01) |
| C09D 7/62 | (2018.01) |
| C09D 7/63 | (2018.01) |
| C09D 125/06 | (2006.01) |
| C09D 133/12 | (2006.01) |

(52) U.S. Cl.
CPC .............. *C09D 7/68* (2018.01); *C09D 125/06* (2013.01); *C09D 133/12* (2013.01); *B05D 5/08* (2013.01); *C08K 9/06* (2013.01); *C08K 2201/005* (2013.01); *C08K 2201/011* (2013.01)

(58) Field of Classification Search
CPC .......... C09D 133/12; B05D 5/08; C08K 9/06; C08K 2201/005; C08K 2201/011
See application file for complete search history.

(56) References Cited

FOREIGN PATENT DOCUMENTS

| | | | |
|---|---|---|---|
| CN | 104822776 | A | 8/2015 |
| CN | 106311103 | A | 1/2017 |
| CN | 106905795 | A | 6/2017 |
| CN | 107998997 | A | 5/2018 |
| CN | 109836052 | A | 6/2019 |
| CN | 109880498 | A | 6/2019 |
| JP | H 01112453 | A | 5/1989 |
| JP | 2000032794 | A | 1/2000 |
| JP | 2005008261 | A | 1/2005 |
| JP | WO 2004052640 | A1 | 4/2006 |
| JP | 2008054245 | A | 3/2008 |
| JP | 2012018856 | A | 1/2012 |
| WO | WO-2012003004 A2 * | 1/2012 | ............... B05D 5/08 |
| WO | WO-2012107406 A1 * | 8/2012 | ............... B05D 5/08 |

OTHER PUBLICATIONS

Midea Group Co., Ltd., 1$^{st}$ CN Office Action, CN Patent Application No. 201911328900.8, Sep. 10, 2021, 8 pgs.

Midea Group Co., Ltd., 2$^{nd}$ CN Office Action, CN Patent Application No. 201911328900.8, Mar. 4, 2022, 6 pgs.

Midea Group Co., Ltd., WO, PCT/CN2020/138021, Mar. 8, 2021, 5 pgs.

Midea Group Co., Ltd., IPRP, PCT/CN2020/138021, May 17, 2022, 6 pgs.

* cited by examiner

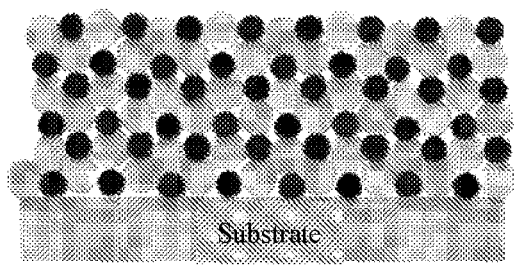
Hydrophobic polymer nanomicrosphere
Inorganic hydrophobic nanoparticle

SUPERHYDROPHOBIC COATING, METHOD FOR PREPARING SAME AND USE THEREOF

CROSS-REFERENCE TO RELATED APPLICATION

The present application is a continuation of PCT International Application No. PCT/CN2020/138021, filed Dec. 21, 2020 entitled "Superhydrophobic Coating, Method for Preparing Same and Use Thereof," which claims priority to Chinese Patent Application No. 201911328900.8, entitled "Superhydrophobic coating, method for preparing same and use thereof", and filed on Dec. 20, 2019, the entire disclosures of which are incorporated herein by reference in their entirety.

TECHNICAL FIELD

The present invention belongs to the technical field of functional materials, and particularly relates to a superhydrophobic coating, method for preparing same and use thereof.

BACKGROUND ART

Due to its special surface structure, superhydrophobic coating has many potential application values such as anti-fouling, anti-fogging, easy cleaning, waterproofing, anti-corrosion, drag reduction, anti-icing, anti-frost and the like. Although superhydrophobic coating has attracted much attention in academic circles, it is hardly used in industry circles. The main reason is that the existing superhydrophobic coating has the problems of poor stability and poor durability, which cannot meet the practical industrial application requirements.

Aiming at the problems of a superhydrophobic coating, the usual solutions are as follows: firstly, improving the durability of a superhydrophobic coating by increasing the thickness of a superhydrophobic coating; and secondly, improving the adhesive force between a superhydrophobic coating and a substrate by adding a bonding layer; however, neither of these two methods can fundamentally solve the problems of poor cohesion and easy peeling of the superhydrophobic coating itself.

Due to its special coating system and surface structural characteristics, in addition to the limitations of the prior art, a superhydrophobic coating can only be obtained by spray coating, for example, adding hydrophobic micro-nano particles and hydrophobic resins together into a solvent to form a superhydrophobic coating material, and obtaining a transparent durable superhydrophobic coating by spray coating; however, the method has the problem of wrapping the nanoparticles by the resin, which is easy to reduce the hydrophobicity of the coating and has poor durability; while neither dip coating nor roll coating can obtain a superhydrophobic coating with a better surface structure.

A superhydrophobic coating also can be obtained by constructing a composite particle dispersion with a polymer microsphere dispersion, a stabilizer and silica sol, and after a hydrophobic coating is formed, spraying a silane coupling agent as a hydrophobic agent on the surface of the hydrophobic coating, and drying. In this method, the positively charged polymer nanoparticles were mixed with the negatively charged silica nanoparticles, and a raspberry structure was constructed by means of electrostatic self-assembly, the coating was only hydrophobic rather than superhydrophobic, and thus it also needed to be further treated with a hydrophobic treatment agent to obtain a superhydrophobic coating. In addition, the coating may also have defects such as a low binding force.

In view of this, the present invention is proposed.

SUMMARY OF THE INVENTION

In order to solve one of the above technical problems, starting from the essence of a superhydrophobic coating, in the present invention, a durable superhydrophobic coating with a new composite structure is researched and designed, the superhydrophobic coating not only has good hydrophobicity, but can also be prepared by a preparation method that is not limited by a spray coating process, and can also be obtained by a dip coating or roll coating process, which can realize the coating of coiled materials and special-shaped parts, so as to expand the application field of the superhydrophobic coating.

The present invention also provides a preparation method of the superhydrophobic coating.

The present invention also provides the use of the superhydrophobic coating.

The superhydrophobic coating of the present invention has a three-dimensional porous nanocomposite structure, and the three-dimensional porous nanocomposite structure comprises a constructing unit and a bonding unit; wherein,
  the constructing unit is formed of inorganic hydrophobic nanoparticles;
  the bonding unit is formed of hydrophobic polymer nanomicrospheres; and
  the inorganic hydrophobic nanoparticles and the hydrophobic polymer nanomicrospheres are interconnected to form uniform pores.

The present invention uses hydrophobic polymer nanomicrospheres instead of a polymer resin as a binder, avoiding the situations in the prior art that the coating roughness is reduced due to a polymer resin binder wrapping hydrophobic nanoparticles and that the upper nanoparticles are damaged due to friction and the bottom polymer layer is difficult to provide superhydrophobicity. The superhydrophobic coating of the present invention has excellent durability (up to 160%), and simultaneously solves the problem that a durable superhydrophobic coating can only be obtained by means of spray coating in the prior art, and can realize the coating of coiled materials and special-shaped parts, so as to expand the application field of the coating.

According to some embodiments of the present invention, the surface of each of the hydrophobic polymer nanomicrospheres is wrapped by a plurality of the inorganic hydrophobic nanoparticles to form a raspberry-shaped multilevel structure. According to some embodiments of the present invention, the mass ratio of the inorganic hydrophobic nanoparticles to the hydrophobic polymer nanomicrospheres is (1 to 10):(1 to 5), preferably (9 to 10):1. Studies show that the superhydrophobic coating obtained using this ratio has the advantages of better uniform dispersion of pores, better connection performance, better durability and higher comprehensive performance.

According to some embodiments of the present invention, the inorganic hydrophobic nanoparticles are at least one selected from fluorine-modified nano-silica, methyl-modified nano-silica, organosilicon-modified nano-silica, fluorine-modified nano-aluminium oxide, methyl-modified nano-aluminium oxide, organosilicon-modified nano-aluminium oxide and methyl-modified nano-ferroferric oxide and the like. Studies show that using the modified nano-silica, nano-aluminium oxide and nano-ferroferric oxide described above as constructing units can significantly improve the durability and bonding ability of the coating, thus improving the comprehensive performance of the coating.

Further, the inorganic hydrophobic nanoparticles are preferably at least one of fluorine-modified nano-silica, methyl-modified nano-silica, fluorine-modified nano-aluminium oxide and methyl-modified nano-ferroferric oxide; further preferably, one or more of heptadecafluorodecyltrimethoxysilane-modified nano-silica, 3-(trimethoxysilyl) propyl methacrylate-modified nano-silica, heptadecafluorodecyltrimethoxysilane-modified nano-aluminium oxide and trimethoxyoctadecylsilane-modified nano-ferroferric oxide.

Among them, the method for preparing the heptadecafluorodecyltrimethoxysilane-modified nano-silica comprises: adding silica sol into an ethanol solution, then adding heptadecafluorodecyltrimethoxysilane for reaction to obtain the theptadecafluorodecyltrimethoxysilane-modified nano-silica.

The method for preparing the 3-(trimethoxysilyl) propyl methacrylate-modified nano-silica comprises: adding silica sol into an ethanol solution, then adding 3-(trimethoxysilyl) propyl methacrylate for reaction to obtain the 3-(trimethoxysilyl) propyl methacrylate-modified nano-silica.

The method for preparing the heptadecafluorodecyltrimethoxysilane-modified nano-aluminium oxide comprises: adding heptadecafluorodecyltrimethoxysilane into an alcohol solvent, adjusting the pH value to 3 to 4, and after hydrolyzing at room temperature, adding nano-aluminum oxide, heating in a water bath for reaction, filtering, washing and vacuum drying.

The method for preparing the trimethoxyoctadecylsilane-modified nano-ferroferric oxide is as follows: ultrasonically dispersing the $Fe_3O_4$ nanoparticles in absolute ethanol, adding trimethoxyoctadecylsilane, and stirring for reaction at room temperature.

Studies show that these nanoparticles described above, as constructing units, not only have better hydrophobic properties than other nanoparticles, but also have better hydrophobicity and durability of coatings when bonded and constructed with hydrophobic polymer nanomicrospheres.

According to some embodiments of the present invention, the hydrophobic polymer nanomicrospheres are at least one selected from polystyrene microspheres, organosilicon microspheres and polymethyl methacrylate microspheres and the like. Studies show that by selecting appropriate hydrophobic polymer nanomicrospheres as binder to match inorganic hydrophobic nanoparticles, the two particles can be interconnected to form uniform pores, thus obtaining a three-dimensional porous nanocomposite structure, and thus effectively solving the problem of the binder wrapping the nanoparticles in the prior art. Further, the hydrophobic polymer nanomicrospheres are preferably polystyrene microspheres and/or polymethyl methacrylate microspheres;

Further preferably, the method for preparing the polystyrene microspheres comprises: adding the styrene monomer into an ethanol solution, and adding potassium persulfate after heating for reaction.

The method for preparing the polymethyl methacrylate microspheres comprises: adding the methyl methacrylate monomer into deionized water, then adding sodium hexadecyl benzene sulfonate, and then adding the potassium persulfate solution, and heating for reaction.

Studies show that, compared with other nanomicrospheres, these two nanomicrospheres can have better adhesion with hydrophobic nanoparticles, further improve the binding force between the constructing unit and the bonding unit, and at the same time, they can also form a bonding effect with the material substrate to ensure that the superhydrophobic coating is not easy to detach from the substrate.

According to some embodiments of the present invention, the inorganic hydrophobic nanoparticles have a particle size of 200 to 600 nm.

According to some embodiments of the present invention, the hydrophobic polymer nanomicrospheres have a particle size of 200 to 800 nm.

Further preferably, when the ratio of the particle size of the inorganic hydrophobic nanoparticles to the particle size of the hydrophobic polymer nanomicrospheres is 1:(1 to 2), the comprehensive performance of the obtained coating is better.

As one of the specific embodiments of the present invention, when the constructing unit is selected from the heptadecafluorodecyltrimethoxysilane-modified nano-silica with an average particle size of 200 nm, the bonding unit is selected from polystyrene microspheres with an average particle size of 200 nm.

When the constructing unit is selected from the 3-(trimethoxysilyl) propyl methacrylate-modified nano-silica with an average particle size of 200 nm, the bonding unit is selected from the organosilicon microspheres with an average particle size of 400 nm.

When the constructing unit is selected from the heptadecafluorodecyltrimethoxysilane-modified nano-aluminium oxide with an average particle size of 400 nm, the bonding unit is selected from the polymethyl methacrylate microspheres with an average particle size of 800 nm.

When the constructing unit is selected from the trimethoxyoctadecylsilane-modified nano-ferroferric oxide with an average particle size of 600 nm, the bonding unit is selected from the polystyrene microspheres with an average particle size of 600 nm.

Studies show that when the constructing unit and the bonding unit are combined according to the above manners, the comprehensive performance of the obtained coating is better.

According to some embodiments of the present invention, when the inorganic hydrophobic nanoparticles are selected from methyl modified nano-ferroferric oxide with an average particle size of 550 to 600 nm, the hydrophobic polymer nanomicrospheres are selected from polystyrene microspheres with an average particle size of 550 to 600 nm, and when the mass ratio of the inorganic hydrophobic nanoparticles to the hydrophobic polymer nanomicrospheres is (9 to 10):1, the water contact angle of the obtained superhydrophobic coating is the largest, while the rolling angle is the smallest, and the overall effect of the coating is the best.

The present invention also provides a preparation method of the superhydrophobic coating described above, comprising: adding the inorganic hydrophobic nanoparticles and the hydrophobic polymer nanomicrospheres into a dispersant and mixing to form a coating solution; then coating the coating solution on a surface of a substrate using a dip coating, roll coating or spray coating process, and drying to form the superhydrophobic coating of the three-dimensional porous nanocomposite structure.

In the present invention, two kinds of specific nanoparticles are selected as constructing units and bonding units, which are mixed and dispersed with a dispersant, and then coated on the surface of a substrate to form a superhydrophobic coating. The method greatly reduces the complexity of the existing superhydrophobic coating preparation process. At the same time, through the mixing of the two kinds of nanoparticles, there is a certain binding force between the two kinds of nanoparticles to form a three-dimensional porous nanocomposite structure, thus effectively solving the problem of poor cohesion in the superhydrophobic coating system and improving the durability of the superhydrophobic coating.

According to some embodiments of the present invention, the mass ratio of the inorganic hydrophobic nanoparticles, the hydrophobic polymer nanomicrospheres and the dispersant is (1 to 10):(1 to 10):(80 to 98), and preferably (9 to 10):1:(89 to 90). Studies show that when the two kinds of particles and dispersant are mixed and dispersed in an appropriate dosage ratio, it is more conducive to uniform dispersion, thus obtaining an ideal superhydrophobic coating.

According to some embodiments of the present invention, the dispersant includes, but is not limited to, at least one of water, ethanol, ethyl acetate, butyl acetate, propylene glycol methyl ether and ethylene glycol butyl ether. Studies show that the selection of an appropriate dispersant is more conducive to the uniform dispersion of the inorganic hydrophobic nanoparticles and the hydrophobic polymer nanomicrospheres, thus improving the comprehensive performance of a superhydrophobic coating.

The present invention also provides use of the superhydrophobic coating in the fields of marine anticorrosion, crude oil transportation, self-cleaning of high-rise glass, waterproofing of electronic instrument, waterproofing and antifouling of fabric, anti-icing of aircraft or oil-water separation and the like.

The present invention has the following beneficial effects:

The superhydrophobic coating prepared in the present invention has the characteristics of uniform nanostructure, good adhesion and durability, and the durability can be increased to 160%; furthermore, the preparation method of the superhydrophobic coating of the invention is simple and suitable for large-scale production, and can realize the coating of coiled materials and special-shaped parts.

BRIEF DESCRIPTION OF THE DRAWINGS

FIG. 1 is the structure diagram of the superhydrophobic coating.

SPECIFIC MODES FOR CARRYING OUT THE EMBODIMENT

The embodiment of the present invention will be described in further detail with reference to the following FIGURE and Examples. The following Examples are used to illustrate the present invention, but cannot be intended to limit the scope of the present invention.

In the following Examples, the specific substrates used are glass, iron, aluminum and the like, but the superhydrophobic coating described in the present invention is not limited to these substrates.

In addition, before applying the coating material, any grease on the surface of the substrate is thoroughly cleaned with pretreatment liquid; however, the present invention is not particularly limited to the pretreatment liquid and the specific pretreatment operation steps, as long as the grease on the surface of the substrate can be cleaned.

Example 1

The present Example provides a preparation method of a superhydrophobic coating, which comprises:

(1) Preparation of a coating material:
In terms of mass fraction, the formula was as follows:
1% of heptadecafluorodecyltrimethoxysilane-modified nano-silica with a particle size of about 200 nm; 5% of polystyrene microspheres with a particle size of about 200 nm; and 94% of water;
among them, the heptadecafluorodecyltrimethoxysilane-modified nano-silica was prepared by the following method: 2 mL of silica sol with a particle size of about 200 nm was added into 40 mL of ethanol solution, then heptadecafluorodecyltrimethoxysilane at a mass fraction of 0.2% was added, and the resultant was reacted for 10 h to prepare the heptadecafluorodecyltrimethoxysilane-modified nano-silica.

Among them, the polystyrene microspheres were prepared by the following method: 3 mL of styrene monomers were added into 200 mL of ethanol solution, and the resultant was heated to 70° C., then 30 mL of potassium persulfate aqueous solution at a mass fraction of 0.1% was added, and the resultant was reacted for 24 h to prepare the polystyrene microspheres.

(2) Preparation of coating: the coating material prepared in step (1) was roll coated on the surface of the substrate, and dried at 100° C. to obtain a superhydrophobic coating.

FIG. 1 is the structure diagram of superhydrophobic coating.

Example 2

The present Example provides a preparation method of a superhydrophobic coating, which comprises:

(1) Preparation of a coating material:
In terms of mass fraction, the formula was as follows:
1% of 3-(trimethoxysilyl) propyl methacrylate-modified nano-silica with a particle size of about 200 nm; 1% of organosilicon microspheres with a particle size of about 400 nm; and 98% of ethanol.

Among them, the 3-(trimethoxysilyl) propyl methacrylate-modified nano-silica was prepared by the following method: 2 mL of silica sol with a particle size of about 200 nm was added into 80 mL of ethanol solution, then 3-(trimethoxysilyl) propyl methacrylate at a mass fraction of 1% was added, and the resultant was reacted for 18 h to prepare the 3-(trimethoxysilyl) propyl methacrylate-modified nano-silica.

Among them, the organosilicon microspheres with a particle size of about 400 nm were purchased from Momentive, and the model number is Tospearl 120.

(2) Preparation of coating: the coating material prepared in step (1) was dip coated on the surface of the substrate, and dried at 150° C. to obtain the superhydrophobic coating.

Example 3

The present Example provides a preparation method of a superhydrophobic coating, which comprises:

(1) Preparation of a coating material:
In terms of mass fraction, the formula was as follows:
5% of heptadecafluorodecyltrimethoxysilane-modified nano-aluminium oxide with a particle size of about 400 nm; 1% of polymethyl methacrylate microspheres with a particle size of about 800 nm; and 94% of ethanol.

Among them, the heptadecafluorodecyltrimethoxysilane-modified nano-aluminium oxide was prepared by the following method: 2 mL of diluted solution of heptadecafluorodecyltrimethoxysilane was added into 100 mL of ethanol solvent, acid aqueous solution was dropwise added to pH value of 3 to 4, the resultant was subjected to hydrolyzation at room temperature for 1 h, 2 g of nano-aluminium oxide of about 400 nm was added into the solution, the resultant was heated to 80° C. in water bath for reaction for a certain time, and then the resultant was filtered, and washed with toluene, and vacuum dried at 60° C. for 24 h to obtain the heptadecafluorodecyltrimethoxysilane-modified nano-aluminium oxide.

Among them, the polymethyl methacrylate microspheres were prepared by the following method: 10 mL of methyl methacrylate monomers were added into 80 mL of deionized water, then 10 mL of 0.025 mol/L sodium hexadecyl benzene sulfonate was added, and then 20 mL of potassium persulfate solution at a mass fraction of 1% was added, and the resultant was heated to 70° C. for reaction for 4 h to obtain the polymethyl methacrylate microspheres.

(2) Preparation of coating: the coating material prepared in step (1) was roll coated on the surface of the substrate, and dried at 140° C. to obtain the superhydrophobic coating.

Example 4

The present Example provides a preparation method of a superhydrophobic coating, which comprises:
(1) Preparation of a Coating Material:
In terms of mass fraction, the formula was as follows:
10% of trimethoxyoctadecylsilane-modified nano-ferroferric oxide with a particle size of about 600 nm, 1% of polystyrene microspheres with a particle size of about 600 nm and 89% of butyl acetate.

Among them, trimethoxyoctadecylsilane-modified nano-ferroferric oxide was prepared by the following method: $Fe_3O_4$ nanoparticles were ultrasonically dispersed in 100 mL of absolute ethanol, 0.5 mL of trimethoxyoctadecylsilane was added, and the resultant was mechanically stirred for reaction for 12 h at room temperature to obtain trimethoxyoctadecylsilane-modified nano-ferroferric oxide.

Among them, the polystyrene microspheres were prepared by the following method: 12 mL of styrene monomers were added into 200 mL of ethanol solution, the resultant was heated to 70° C., and then 20 mL of potassium persulfate aqueous solution at a mass fraction of 0.1% was added, and the resultant was reacted for 24 h to obtain the polystyrene microspheres.
(2) Preparation of Coating:
The coating material prepared in step (1) was dip coated on the surface of the substrate, and dried at 150° C. to obtain the superhydrophobic coating.

Comparative Example 1

The present Comparative Example provides a preparation method of a coating, which comprises:
(1) Preparation of a Coating Material:
In terms of mass fraction, the formula was as follows:
1% of heptadecafluorodecyltrimethoxysilane-modified nano-silica with a particle size of about 400 nm, 25% of silicone resin, and 74% of propylene glycol methyl ether.

Among them, the heptadecafluorodecyltrimethoxysilane-modified nano-silica was prepared by the following method: 2 mL of silica sol with a particle size of about 400 nm was added into 40 mL of ethanol solution, then the heptadecafluorodecyltrimethoxysilane at a mass fraction of 0.2% was added, and the resultant was reacted for 10 h to obtain the heptadecafluorodecyltrimethoxysilane-modified nano-silica;

among them, the silicone resin was purchased from Wacker, Germany, and the model number is Silres REN 80.

(2) Preparation of coating: the coating material prepared in step (1) was roll coated on the surface of the substrate, and dried at 150° C. to obtain the superhydrophobic coating.

Comparative Example 2

The present Comparative Example provides a preparation method of a coating, which comprises:
(1) Preparation of a coating material:
In terms of mass fraction, the formula was as follows:
25% of silicone resin, and 75% of propylene glycol methyl ether.

Among them, the silicone resin was purchased from Wacker, Germany, and the model number is Silres REN 80.

(2) Preparation of coating: the coating material prepared in step (1) was roll coated on the surface of the substrate, and dried at 150° C. to obtain the common hydrophobic coating.

Comparative Example 3

The present Comparative Example provides a preparation method of a coating, which comprises:
(1) Preparation of a coating material:
In terms of mass fraction, the formula was as follows:
3% of 3-(trimethoxysilyl) propyl methacrylate-modified nano-silica with a particle size of about 400 nm, 5% of organosilicon microspheres with a particle size of about 1.2 μm, and 92% of ethylene glycol methyl ether.

Among them, the 3-(trimethoxysilyl) propyl methacrylate-modified nano-silica was prepared by the following method: 2 mL of silica sol with a particle size of about 400 nm was added into 80 mL of ethanol solution, then the 3-(trimethoxysilyl) propyl methacrylate at a mass ratio of 1% was added, and the resultant was reacted for 18 h to obtain the 3-(trimethoxysilyl) propyl methacrylate-modified nano-silica.

Among them, the organosilicon microspheres were purchased from Momentive, and the model number is Tospearl 120.

(2) Preparation of coating: the coating material prepared in step (1) was dip coated on the surface of the substrate, and dried at 140° C. to obtain the superhydrophobic coating.

Comparative Example 4

The present Comparative Example provides a preparation method of a coating, which comprises:
(1) Preparation of a coating material:
In terms of mass fraction, the formula was as follows:
3% of heptadecafluorodecyltrimethoxysilane-modified nano-silica with a particle size of about 1 μm, 5% of organosilicon microspheres with a particle size of about 600 nm, and 92% of ethanol.

Among them, the heptadecafluorodecyltrimethoxysilane-modified nano-silica was prepared by the following method: 2 mL of silica sol with a particle size of about 1 μm was added into 40 mL of ethanol solution, then heptadecafluorodecyltrimethoxysilane at a mass fraction of 0.2% was added, and the resultant was reacted for 10 h to obtain the heptadecafluorodecyltrimethoxysilane-modified nano-silica.

Among them, the organosilicon microspheres were purchased from Momentive, and the model number is Tospearl 120.

(2) Preparation of coating: the coating material prepared in step (1) was dip coated on the surface of the substrate, and dried at 150° C. to obtain the superhydrophobic coating.

Test Example 1

1. Hydrophobic performance test: the water contact angle and rolling angle of the coatings of Examples 1-4 and Comparative Examples 1-4 were measured with a contact angle meter, and the results are shown in Table 1:

TABLE 1

|  | Water contact angle (°) | Rolling angle (°) |
| --- | --- | --- |
| Example 1 | 150 | <5 |
| Example 2 | 155 | <10 |
| Example 3 | 160 | <10 |
| Example 4 (best effect) | 160 | <5 |
| Comparative Example 1 | 155 | <10 |
| Comparative Example 2 | 105 | 50-70 |
| Comparative Example 3 | 160 | <10 |
| Comparative Example 4 | 150 | 70-90 |

As can be seen from Table 1, the superhydrophilic coatings obtained in Examples 1-4 and Comparative examples 1 and 3 have larger water contact angles and smaller rolling angles, among which the superhydrophilic coating obtained in Example 4 has the best performance. However, the water contact angle of Comparative Example 2 was too small and the rolling angle of Comparative Example 2 was too large, which is a common hydrophobic coating; and the rolling angle of Comparative Example 4 was too large.

2. Accelerated durability test: 3 samples were fixed on the sample holder, and immersed in a water tank with a water flow rate of 1 L/min to 3 L/min (non-circulating water was used), then the samples were taken out and dried, and rolling angles at any three points of the samples were tested, when the rolling angles are all attenuated to ≥90°, the time for immersion of the samples in running water was recorded, and the actual temperature and humidity of the test environment were recorded. The results are shown in Table 2:

TABLE 2

|  | Example 1 | Example 2 | Example 3 | Example 4 | Comparative Example 1 | Comparative Example 3 |
| --- | --- | --- | --- | --- | --- | --- |
| Accelerated durability | 21 h | 16 h | 19 h | 26 h | 8 h | 12 h |

The above embodiments are only used to illustrate the present invention, but are not a limitation to the present invention. Although the present invention has been described in detail with reference to the embodiments, it should be understood by a person skilled in the art that various combinations, modifications or equivalent substitutions of the technical solutions of the present invention will not depart from the spirit and scope of the technical solutions of the present invention, and all should be covered within the claims of the present invention.

INDUSTRIAL APPLICABILITY

The present application provides a superhydrophobic coating as well as a preparation method and use thereof. The superhydrophobic coating is of a three-dimensional porous nanocomposite structure; the three-dimensional porous nanocomposite structure comprises a constructing unit and a bonding unit; wherein, the constructing unit is formed of inorganic hydrophobic nanoparticles; the bonding unit is formed of hydrophobic polymer nanomicrospheres; and the inorganic hydrophobic nanoparticles and the hydrophobic polymer nanomicrospheres are interconnected to form uniform pores. The durable superhydrophobic coating of a novel composite structure is researched and designed from the essence of the superhydrophobic coating, the durable superhydrophobic coating is not limited by a spray coating process and can be treated through a dip coating or roll coating process, coating of coiled materials and special-shaped parts can be achieved, and the comprehensive performance of the obtained coating is good, the application field of the coating is expanded, and have good economic value and application prospects.

What is claimed is:

1. A superhydrophobic coating comprising:
a three-dimensional porous nanocomposite structure, wherein the three-dimensional porous nanocomposite structure comprises a constructing unit and a bonding unit;
wherein the constructing unit comprises inorganic hydrophobic nanoparticles;
the bonding unit comprises hydrophobic polymer nanomicrospheres; and
the inorganic hydrophobic nanoparticles and the hydrophobic polymer nanomicrospheres are interconnected to form uniform pores, wherein a surface of each of the hydrophobic polymer nanomicrospheres is wrapped by a plurality of the inorganic hydrophobic nanoparticles, wherein the hydrophobic polymer nanomicrospheres comprise an element selected from a group consisting of: polystyrene microspheres, organosilicon microspheres and polymethyl methacrylate microspheres, and wherein a ratio of a particle size of the inorganic hydrophobic nanoparticles to a particle size of the hydrophobic polymer nanomicrospheres is between 1:1 and 1:2.

2. The superhydrophobic coating according to claim 1, wherein the inorganic hydrophobic nanoparticles comprise an element selected from a group consisting of: fluorine-modified nano-silica, methyl-modified nano-silica, organosilicon-modified nano-silica, fluorine-modified nano-aluminium oxide, methyl-modified nano-aluminium oxide, organosilicon-modified nano-aluminium oxide and methyl-modified nano-ferroferric oxide.

3. The superhydrophobic coating according to claim 1, wherein the inorganic hydrophobic nanoparticles have a particle size of 200 to 600 nm; and/or
the hydrophobic polymer nanomicrospheres have a particle size of 200 to 800 nm.

4. The superhydrophobic coating according to claim 1, wherein when the constructing unit comprises heptadecafluorodecyltrimethoxysilane-modified nano-silica having an average particle size of 200 nm, the bonding unit comprises polystyrene microspheres having an average particle size of 200 nm; and/or,
when the constructing unit comprises 3-(trimethoxysilyl) propyl methacrylate-modified nano-silica with an average particle size of 200 nm, the bonding unit comprises organosilicon microspheres with an average particle size of 400 nm; and/or when the constructing unit comprises heptadecafluorodecyltrimethoxysilane-modified nano-aluminium oxide with an average particle size of 400 nm, the bonding unit comprises polymethyl methacrylate microspheres with an average particle size of 800 nm; and/or, when the constructing unit comprises trimethoxyoctadecylsilane-modified nano-ferroferric oxide with an average particle size of 600 nm, the bonding unit comprises polystyrene microspheres with an average particle size of 600 nm.

5. The superhydrophobic coating according to claim 1, wherein when the inorganic hydrophobic nanoparticles comprises methyl-modified nano-ferroferric oxide with an average particle size of 550 to 600 nm, the hydrophobic polymer nanomicrospheres comprises polystyrene microspheres with an average particle size of 550 to 600 nm, and a mass ratio of the inorganic hydrophobic nanoparticles to the hydrophobic polymer nanomicrospheres is (9 to 10):1.

6. A preparation method of a superhydrophobic coating comprising:

adding inorganic hydrophobic nanoparticles and hydrophobic polymer nanomicrospheres into a dispersant and mixing to form a coating solution, wherein the hydrophobic polymer nanomicrospheres have a particle size of 200 to 800 nm;

coating the coating solution on a surface of a substrate using a dip coating, roll coating or spray coating process, and drying to form the superhydrophobic coating of a three-dimensional porous nanocomposite structure.

7. The preparation method according to claim 6, wherein a mass ratio of the inorganic hydrophobic nanoparticles, the hydrophobic polymer nanomicrospheres and the dispersant is (1 to 10):(1 to 10):(80 to 98).

8. The preparation method according to claim 6, wherein the dispersant comprises at least one of water, ethanol, ethyl acetate, butyl acetate, propylene glycol methyl ether and ethylene glycol butyl ether.

9. A method of using the superhydrophobic coating according to claim 1 in marine anticorrosion, crude oil transportation, self-cleaning of high-rise glass, waterproofing of electronic instrument, waterproofing and antifouling of fabric, anti-icing of aircraft or oil-water separation.

10. The superhydrophobic coating according to claim 1, wherein the hydrophobic polymer nanomicrospheres are used as a binder instead of a polymer resin.

11. The superhydrophobic coating according to claim 1, wherein the hydrophobic polymer nanomicrospheres have a particle size of 200 to 800 nm.

12. The preparation method according to claim 6, further comprising forgoing using a polymer resin as a binder.

* * * * *